No. 634,620. Patented Oct. 10, 1899.
J. McK. HOLTEN.
OYSTER TONGS.
(Application filed Jan. 31, 1899.)
(No Model.)
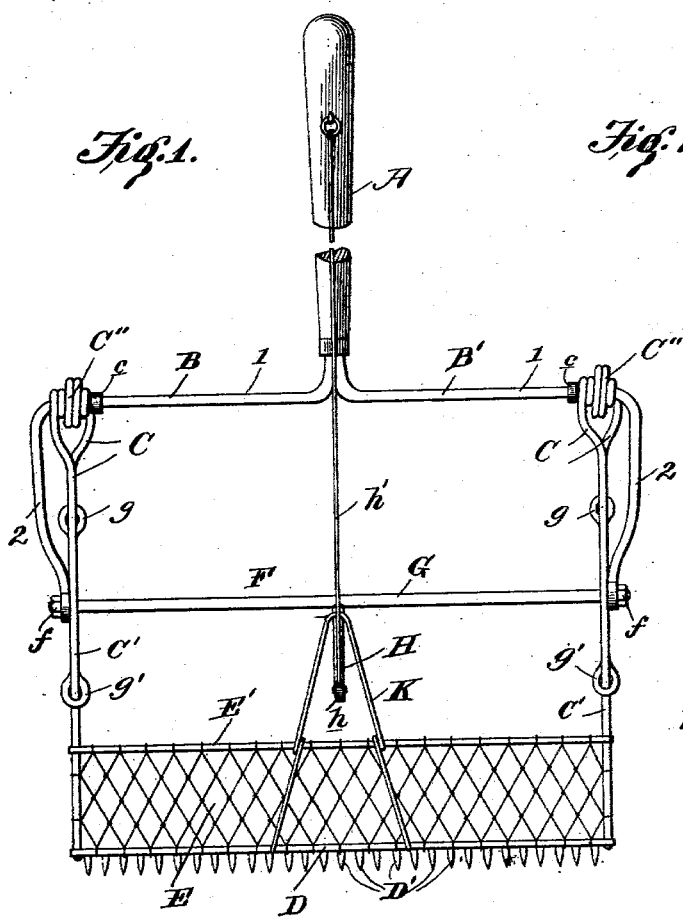
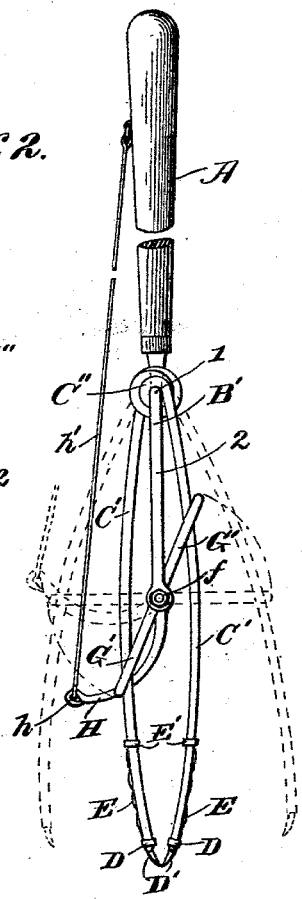
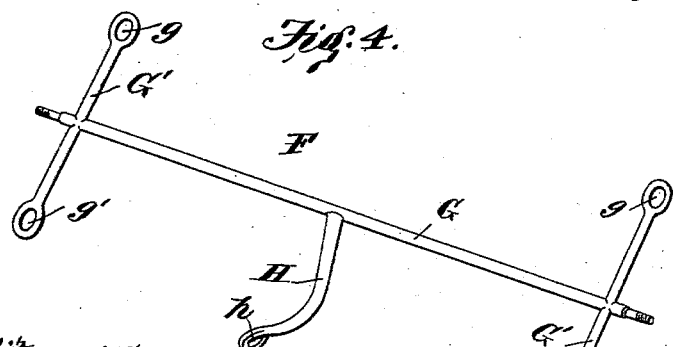
Witnesses:
G. A. Pennington
Jas. F. Williams
Inventor:
James M. Holten,
by Milo B. Stevens & Co.
Attys.
THE NORRIS PETERS CO., PHOTO-LITHO., WASHINGTON, D. C.

UNITED STATES PATENT OFFICE.

JAMES McKEEVER HOLTEN, OF FAIRTON, NEW JERSEY.

OYSTER-TONGS.

SPECIFICATION forming part of Letters Patent No. 634,620, dated October 10, 1899.

Application filed January 31, 1899. Serial No. 703,999. (No model.)

*To all whom it may concern:*

Be it known that I, JAMES McKEEVER HOLTEN, a citizen of the United States, residing at Fairton, in the county of Cumberland and State of New Jersey, have invented certain new and useful Improvements in Oyster-Tongs; and I do hereby declare the following to be a full, clear, and exact description of the invention, such as will enable others skilled in the art to which it appertains to make and use the same.

My invention relates to improved oyster-tongs, and embodies the constructions and combinations of parts to be hereinafter fully described, and definitely pointed out in the claims.

In the accompanying drawings, wherein one embodiment of the invention is delineated for the sake of illustration, like reference characters designate corresponding parts in the several views.

Figure 1 is a side elevation of the entire device. Fig. 2 is an end elevation of Fig. 1, showing in dotted lines the open position of the tongs. Fig. 3 is a detail of the spring-arms, and Fig. 4 is a detail view of the operating device.

Referring to the illustrations, A represents the handle, and B B' outwardly-turned extensions thereof, the latter constituting the supporting members for the tongs. The branches B B' comprise each the horizontal portions 1 and the vertical portions 2. Adapted to hang loosely on the horizontal portions 1, near their extreme ends, and limited in their lateral movement by the collars or stops c are spring-arms C. These arms are peculiar in construction and are formed of a continuous piece of spring metal, so bent as to have the arms C' C' adapted to be spread apart and the coiled spring connecting top portion C'' adapted to normally force and hold the said arms together. Bars D, having rake-teeth D', connect the respective ends of the arms C' C' and constitute therewith the gathering or picking-up jaws of the tongs. A network E is secured to the bars D on both sides of the device and extends upwardly a relatively short distance to the cross-bar E', also connecting the arms C' C'. These networks when the tongs are closed form a receptacle for the oysters.

Pivoted in eyelets at the ends of the portions 2 is the operating device F, the same being held in proper position by nuts *f f*. This operating device comprises a pivot-bar G, which occupies a position intermediate the arms C' C' and has rigidly secured near the ends thereof, at their centers, links or spreading-bars G' G'. These links project outwardly to the sides of the bar G at right angles thereto and have their ends formed into eyes or hooks *g g'*, which eyes or hooks are arranged in turn to slidably engage the rearmost arms C' and the latter with the foremost arms C'.

The bar G is desired to be readily turned on its pivots, and in order that this may be done a lever or arm H, preferably curved upwardly slightly, as shown, is provided, the same at its inner end being rigidly secured to the pivot-bar and at its outer end being provided with a hook *h*. Fastened to this hook and running upwardly to the handle in convenient reach of the operator is a rope or chain *h'*. This rope or chain is adapted to be manipulated to draw upon or raise the lever H, and in order that the same may not be elevated higher than desirable the stop K is employed. The stop is of inverted-V shape and is formed of metallic wire, its ends being twisted around the connecting-rods D and E' and the bent portion extending upward a suitable distance to limit the upward movement of the lever H working therein.

From the foregoing the operation of the device will be apparent. The tongs being placed in position, with the jaws normally closed by reason of the spring-arms C, the operator will pull on the rope or chain *h'*, thus drawing the lever H upwardly until limited by the stop, turning the pivot-bar G in its bearings, and consequently sliding the links on the arms C' C' from an approximate vertical or closed position to an approximate horizontal or open position. It will thus be seen that by reason of the loose engagement between the links and arms C' C' when the links are turned from their normal position the arms will be opened and the gathering-jaws spread apart. When it is desired to raise the device, all that is necessary is for the operator to release the rope or chain, and the spring-arms will automatically close the jaws and gather and hold the oysters in the netting.

Having thus described the invention, what is claimed as new, and desired to be secured by Letters Patent, is—

1. Oyster-tongs comprising a support, jaws, supporting-arms for the jaws each formed of a continuous piece of spring metal bent intermediate its ends, and means for opening the jaws, substantially as described.

2. Oyster-tongs comprising a support, the spring-arms C each formed of a single piece of metal, pivotal connections intermediate the ends of the spring-arms with the support, jaws carried by the arms, and means for operating the jaws, substantially as described.

3. Oyster-tongs comprising a support, jaws on the support, and means for opening the jaws comprising a pivoted cross-bar, connections between the cross-bar and the jaws, slidably engaging the jaws and means for turning the cross-bar to open the jaws, substantially as described.

4. Oyster-tongs comprising a support, spring-retained jaws on the support, and mechanism slidably engaging the jaws for opening the same, substantially as described.

5. Oyster-tongs comprising a support, jaws on the support, and mechanism slidably engaging the jaws to open and close the same, substantially as described.

6. Oyster-tongs comprising a support, jaws on the support, spreading-bars slidably engaging the jaws, and means for operating the bars to open and close the jaws, substantially as described.

7. Oyster-tongs comprising a support, jaws on the support, spacing-bars slidably engaging the jaws, mechanism for operating the bars to open and close the jaws, and means for limiting the movement of said mechanism, substantially as described.

8. Oyster-tongs comprising a support, jaws on the support, and means for opening and closing the jaws consisting of a pivot-bar, spreading-bars near the ends of the pivot-bar having sliding engagement with the jaws, and a projection or lever on the pivot-bar adapted to be operated upon to turn the pivot-bar, substantially as described.

9. Oyster-tongs comprising a support having the vertical portions 2, jaws on the support, mechanism pivoted in said vertical portions and slidably connected to the respective jaws, and means for operating said mechanism to open and close the jaws, substantially as described.

10. Oyster-tongs comprising a support, jaws on the support, and means for opening and closing the jaws consisting of a pivot-bar, spreading-bars near the ends of the pivot-bar having sliding engagement with the jaws, a projection or lever on the pivot-bar adapted to be operated upon to turn the pivot-bar, and a stop for limiting the movement of said lever, substantially as described.

11. Oyster-tongs comprising a support, jaws, supporting-arms for the jaws each formed of a continuous piece of metal coiled intermediate its ends to form a spring, and means for opening the jaws against the tension of the spring, substantially as described.

12. Oyster-tongs comprising a support, jaws, supporting-arms for the jaws each formed of a continuous piece of spring metal, coiled intermediate its ends, pivotal connection between the coiled portions of the supporting-arms and the support, and means for operating the jaws, substantially as described.

13. Oyster-tongs comprising a support, jaws, supporting-arms for the jaws bent to have a springing tendency in one direction, and means for operating the jaws against the tension of the spring, substantially as described.

In testimony whereof I affix my signature in presence of two witnesses.

JAMES McKEEVER HOLTEN.

Witnesses:
W. B. TRENCHARD,
WM. D. DONAGHAY.